United States Patent
Takayama

(10) Patent No.: US 12,054,069 B2
(45) Date of Patent: Aug. 6, 2024

(54) VEHICLE AND CHARGING METHOD

(71) Applicant: TOYOTA JIDOSHA KABUSHIKI KAISHA, Toyota (JP)

(72) Inventor: Daiki Takayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/828,318

(22) Filed: May 31, 2022

(65) Prior Publication Data
US 2022/0388420 A1 Dec. 8, 2022

(30) Foreign Application Priority Data

Jun. 2, 2021 (JP) ................................. 2021-092859

(51) Int. Cl.
*B60L 53/66* (2019.01)
*B60L 53/63* (2019.01)
*G06Q 50/06* (2024.01)

(52) U.S. Cl.
CPC ............. *B60L 53/665* (2019.02); *B60L 53/63* (2019.02); *G06Q 50/06* (2013.01)

(58) Field of Classification Search
CPC ........ B60L 53/64; B60L 53/665; G06Q 50/06
See application file for complete search history.

(56) References Cited

U.S. PATENT DOCUMENTS

| | | | |
|---|---|---|---|
| 2013/0257387 A1 | 10/2013 | Yokoyama et al. | |
| 2013/0346308 A1 | 12/2013 | Naito et al. | |
| 2016/0200211 A1* | 7/2016 | Gibeau | B60L 53/64 |
| | | | 701/22 |
| 2018/0111495 A1 | 4/2018 | Kinomura | |
| 2018/0118045 A1* | 5/2018 | Gruzen | B60L 53/665 |
| 2019/0383637 A1* | 12/2019 | Teske | B60L 53/14 |
| 2020/0122594 A1 | 4/2020 | Ichikawa | |
| 2021/0387541 A1 | 12/2021 | Astorg et al. | |
| 2022/0194255 A1* | 6/2022 | Hartnagel | G06Q 50/06 |

FOREIGN PATENT DOCUMENTS

| | | |
|---|---|---|
| JP | 2013-62918 A | 4/2013 |
| JP | 6131615 B2 | 5/2017 |
| JP | 2017-143634 A | 8/2017 |
| JP | 2018-074673 A | 5/2018 |
| JP | 2018-74815 A | 5/2018 |
| JP | 2020-65394 A | 4/2020 |
| WO | 2020/083756 A1 | 4/2020 |

OTHER PUBLICATIONS

Kler, Dhruv. "An Energy Management System for a Remote Grid Connected DC Fast Charging Station." 29043670 McGill University (Canada), 2021. Ann Arbor: ProQuest. Web. Mar. 26, 2024 (Year: 2021).*

* cited by examiner

*Primary Examiner* — Michael P Harrington
(74) *Attorney, Agent, or Firm* — Sughrue Mion, PLLC

(57) ABSTRACT

A controller that controls charging of a power storage in a vehicle includes an obtaining unit that obtains a fee table showing charge fee information for each of a plurality of maximum supply powers of a power feed facility outside the vehicle before start of charging of the power storage with the use of the power feed facility, a setting unit that sets a criterion for selection of maximum supply power of the power feed facility, a selector that selects one maximum supply power in the fee table in accordance with the criterion set by the setting unit, and a notification unit that notifies the power feed facility of the maximum supply power selected by the selector.

5 Claims, 8 Drawing Sheets

《FEE TABLE》

| SUPPLY POWER | MAXIMUM SUPPLY POWER | FEE CHARGE RATE |
|---|---|---|
| 1-350 [kW] | 150kW | 0.99 [$/min] |
| 1-125 [kW] | 100kW、125kW | 0.69 [$/min] |
| 1-75 [kW] | 50kW、75kW | 0.25 [$/min] |

《MAXIMUM SUPPLY POWER CORRESPONDING TO EACH MODE》

| | MAXIMUM SUPPLY POWER | CHARGING TIME PERIOD | CHARGE FEE | COMPREHENSIVE EVALUATION VALUE |
|---|---|---|---|---|
| | 50 [kW] | 55 [min] | 14 [$] | 69 [pt] |
| FEE PRIORITIZED → | 75 [kW] | 38 [min] | 10 [$] | 48 [pt] |
| | 100 [kW] | 31 [min] | 21 [$] | 52 [pt] |
| BALANCE → | 125 [kW] | 28 [min] | 19 [$] | 47 [pt] |
| TIME PRIORITIZED → | 150 [kW] | 26 [min] | 26 [$] | 52 [pt] |

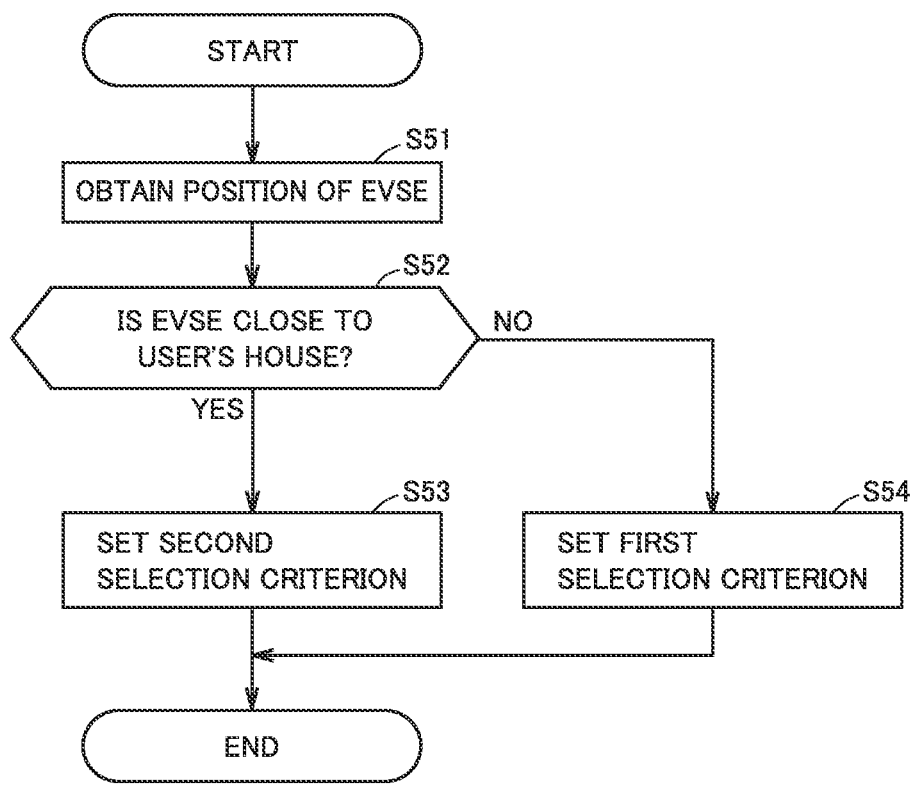

VEHICLE AND CHARGING METHOD

This nonprovisional application is based on Japanese Patent Application No. 2021-092859 filed with the Japan Patent Office on Jun. 2, 2021, the entire contents of which are hereby incorporated by reference.

BACKGROUND

Field

The present disclosure relates to a vehicle and a method of charging a power storage mounted on a vehicle.

Description of the Background Art

Japanese Patent Laying-Open No. 2018-74673 discloses a method of charging a power storage mounted on a vehicle with the use of a power feed facility that charges a fee on time basis. In the charging method disclosed in Japanese Patent Laying-Open No. 2018-74673, cost performance (an amount of charging power per unit price) is predicted, and when cost performance is poor, a notification is given to a user.

SUMMARY

A time period required for charging is shorter as maximum supply power of a power feed facility is higher. Depending on specifications or a state of a vehicle, however, the vehicle may not be able to adapt to power feed with high electric power. Therefore, a power feed facility configured to be variable in maximum supply power is expected to widely be used in the future. Maximum supply power refers to a maximum electric power value of electric power supplied from the power feed facility to the vehicle during charging.

With increase in maximum supply power of the power feed facility, however, an amount of power consumption in a power grid that supplies electric power to the power feed facility temporarily increases, and balance between supply and demand of the power grid tends to be lost. In order to achieve both of convenience of a user and energy management of the power grid, a fee structure in which a charge fee is varied in accordance with maximum supply power of the power feed facility may be adopted. Specifically, by setting a charge fee (for example, a fee charge rate per unit time) to be higher with increase in maximum supply power of the power feed facility, the amount of power consumption in the power grid may be adjusted so as not to excessively increase.

When the fee structure as above is adopted, maximum supply power desired by a user is expected to vary depending on a situation. Selection of appropriate maximum supply power in such a charging system, however, has not yet sufficiently be discussed.

The present disclosure was made to solve the problem above, and an object thereof is to provide a vehicle and a charging method that allow selection of appropriate maximum supply power in charging in which a fee is charged in a fee structure varied in charge fee in accordance with maximum supply power of a power feed facility.

A vehicle according to a first point of view of the present disclosure includes a power storage and a controller that controls charging of the power storage. The controller includes an obtaining unit, a setting unit, a selector, and a notification unit shown below.

The obtaining unit is configured to obtain a fee table showing charge fee information for each of a plurality of maximum supply powers of a power feed facility outside the vehicle before start of charging of the power storage by using the power feed facility. The setting unit is configured to set a criterion for selection of maximum supply power of the power feed facility. The selector is configured to select one maximum supply power in the fee table in accordance with the criterion set by the setting unit. The notification unit is configured to notify the power feed facility of the maximum supply power selected by the selector.

Maximum supply power refers to a maximum electric power value of electric power supplied from the power feed facility to the vehicle during charging. The charge fee information may be information representing a fee charge rate or information representing a charge fee for one charging.

In the vehicle, appropriate maximum supply power is selected in accordance with the criterion set by the setting unit. Therefore, appropriate maximum supply power can be selected and the power feed facility can be notified of the same.

The setting unit may be configured to set one criterion from among prescribed options in accordance with an input from a user. With the vehicle configured as such, the user can select the criterion. Therefore, maximum supply power that meets a demand of the user can be selected and the power feed facility can be notified of the same.

The fee table may show a fee structure in which a fee charge rate is higher as maximum supply power of the power feed facility is higher. The prescribed options may include a first criterion by which maximum supply power of the power feed facility shortest in charging time period of the power storage is selected and a second criterion by which maximum supply power of the power feed facility most inexpensive in charge fee of the power storage is selected.

According to the configuration, the user can shorten the charging time period or lower the charge fee depending on a situation. The fee charge rate shown in the fee table may be a fee charge rate per unit time or a fee charge rate per unit supply power amount.

The prescribed options may further include a third criterion by which maximum supply power of the power feed facility best in comprehensive evaluation of charging time period and charge fee of the power storage is selected. According to such a configuration, the user can select maximum supply power well balanced between the charging time period and the charge fee.

The fee charge rate shown in the fee table may be the fee charge rate per unit time. The selector may be configured to predict the charging time period based on the fee table and to calculate the charge fee based on the predicted charging time period and the fee charge rate per unit time.

According to the configuration, the charging time period and the charge fee for each maximum supply power are more readily appropriately evaluated. The selector may predict that the charging time period is shorter as maximum supply power is higher.

The power feed facility may be a public power feed facility. The setting unit may be configured to set the criterion based on a position of the power feed facility. In the vehicle configured as such, the criterion is automatically set depending on a position of the power feed facility. There are public power feed facilities at various places. According to the configuration, maximum supply power in conformity with the position of the power feed facility can be selected and the power feed facility can be notified of the same.

The power feed facility may be configured to supply direct-current (DC) power.

When the power storage of the vehicle is charged with the use of an alternating-current (AC) power feed facility (an AC type power feed facility) that supplies AC power, in general, the vehicle converts AC power supplied from the AC power feed facility into DC power and that DC power is supplied to the power storage. For the AC power feed facility, maximum supply power is often determined by a capacity of a charging cable. When the power storage of the vehicle is charged with the use of a DC power feed facility (a DC type power feed facility) that supplies DC power, on the other hand, AC/DC conversion (power conversion from AC to DC) in the vehicle is not required. Therefore, as the vehicle notifies the DC power feed facility of appropriate maximum supply power, DC power supplied from the DC power feed facility can be supplied as it is to the power storage of the vehicle, without power conversion by the vehicle.

The selector may be configured to exclude, when input electric power to the power storage is restricted to an input upper limit value or less, maximum supply power at which the input electric power to the power storage exceeds the input upper limit value, of the maximum supply powers shown in the fee table and to select one maximum supply power from at least one maximum supply power not excluded, of the maximum supply powers.

For example, in order to protect the power storage or a peripheral component thereof, input electric power to the power storage may be restricted to an input upper limit value or less. According to the configuration, maximum supply power in conformity with the input upper limit value of the power storage can be selected and the power feed facility can be notified of the same.

The obtaining unit may be configured to send specifying information for specifying the power feed facility to a server outside the vehicle and to request the server to transmit the fee table of the power feed facility specified by the specifying information.

According to the configuration, the fee table of the power feed facility of interest (that is, the power feed facility to be used in present charging) can be obtained from the server outside the vehicle. The server may be a computer that collectively manages information on a plurality of power feed facilities.

The specifying information may include an identification code for identifying the power feed facility and a position of the power feed facility.

According to the configuration, the power feed facility of interest is more readily specified. For example, even though a power feed facility can be specified based on the identification code alone in one country, there may be power feed facilities with the same identification code in the whole world including all countries. In addition, even though power feed facilities are identical in model, the charge fee may be different depending on locations where they are installed (for example, countries where they are installed). In the configuration, a power feed facility can more appropriately be specified based on the position of the power feed facility. The vehicle may obtain the identification code from the power feed facility. The identification code may be composed of at least one of a number, a sign, and a character.

Any vehicle described above may be an electrically powered vehicle that travels with electric power stored in the power storage. The electrically powered vehicle includes not only a battery electric vehicle (BEV) and a plug-in hybrid electric vehicle (PHEV) but also a fuel cell electric vehicle (FCEV) and a range extender EV.

In a charging method according to a second point of view of the present disclosure, a power storage mounted on a vehicle is charged with the use of a power feed facility varied in charge fee depending on maximum supply power. The charging method includes processing A to E shown below. In processing A, the vehicle sets a criterion for selecting maximum supply power of the power feed facility. In processing B, the vehicle obtains a fee table showing charge fee information for each of a plurality of maximum supply powers of the power feed facility before start of charging of the power storage by using the power feed facility. In processing C, the vehicle selects one maximum supply power in the fee table in accordance with the set criterion. In processing D, the vehicle notifies the power feed facility of the selected maximum supply power. In processing E, the power feed facility supplies electric power for charging the power storage to the vehicle under a power feed condition in accordance with the maximum supply power of which the power feed facility was notified, while a fee is being charged in accordance with the fee table based on the charge fee information corresponding to the maximum supply power of which the power feed facility was notified.

According to the charging method as well, in charging in which a fee is charged under the fee structure varied in charge fee in accordance with maximum supply power of the power feed facility, as in the vehicle described previously, appropriate maximum supply power can be selected.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 12 is a flowchart showing a modification of the processing shown in FIG. 5.

DESCRIPTION OF THE PREFERRED EMBODIMENTS

Figure 1:
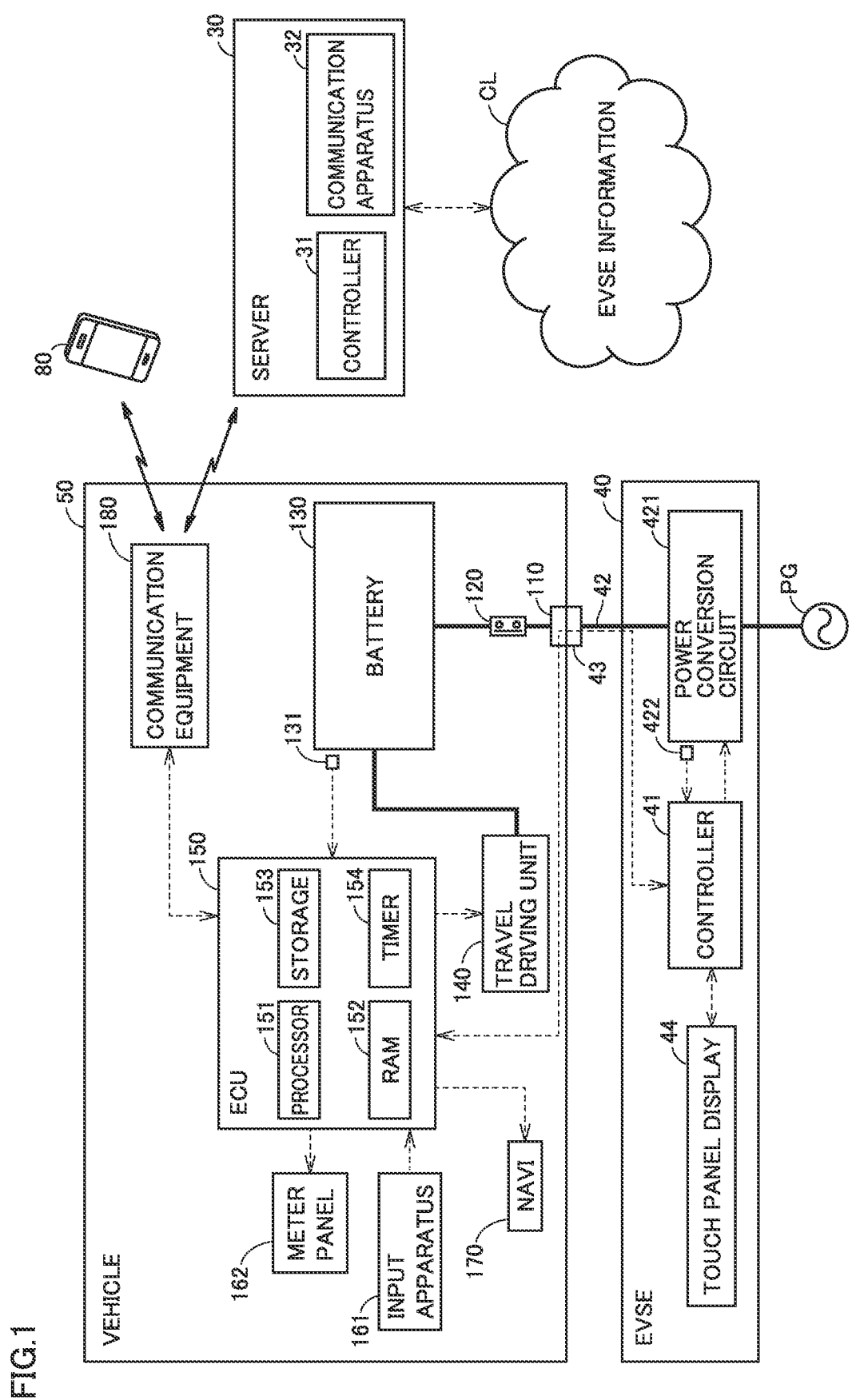
FIG. 1 is a diagram showing a charging system according to an embodiment of the present disclosure.

An embodiment of the present disclosure will be described in detail below with reference to the drawings. The same or corresponding elements in the drawings have the same reference characters allotted and description thereof will not be repeated.

FIG. 1 is a diagram showing a charging system according to this embodiment. Referring to FIG. 1, this charging system includes a server 30, EVSE 40, and a vehicle 50. Vehicle 50 includes a battery 130 in which electric power for travel is stored. Vehicle 50 can travel with electric power stored in battery 130. Vehicle 50 according to this embodiment is a battery electric vehicle (BEV) not including an engine (internal combustion engine).

Vehicle 50 includes an electronic control unit (which is referred to as an "ECU" below) 150. ECU 150 controls charging and discharging of battery 130. ECU 150 controls communication with the outside of vehicle 50.

Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of secondary batteries (which are generally also referred to as "cells") electrically connected to one another. Instead of the secondary battery, another power storage such as an electric double layer capacitor may be adopted. Battery 130 according to this embodiment corresponds to an exemplary "power storage" according to the present disclosure.

Vehicle 50 further includes an inlet 110 that receives electric power supplied from the outside of vehicle 50, a monitoring module 131 that monitors a state of battery 130, and a charge relay 120 located between battery 130 and inlet 110.

Monitoring module 131 includes various sensors that detect a state (for example, a voltage, a current, and a temperature) of battery 130 and outputs a result of detection to ECU 150. Monitoring module 131 may be a battery management system (BMS) that further performs, in addition to the sensor function, a state of charge (SOC) estimation function, a state of health (SOH) estimation function, a function to equalize a cell voltage, a diagnosis function, and a communication function. ECU 150 can obtain a state (for example, a temperature, a current, a voltage, an SOC, and an internal resistance) of battery 130 based on an output from monitoring module 131.

Inlet 110 is constructed such that a connector 43 of a charging cable 42 of EVSE 40 which will be described later can be connected. Charge relay 120 is configured to switch between connection and disconnection of an electric power path from inlet 110 to battery 130.

EVSE 40 corresponds to exemplary electric vehicle supply equipment (EVSE). EVSE corresponds to a power feed facility outside the vehicle. EVSE 40 is, for example, public EVSE that a large number of unspecified users are permitted to use. EVSE 40 is configured to electrically be connected to an external power supply PG. External power supply PG may be a power grid provided by an electric power company. External power supply PG may be a large-scale power grid provided as an infrastructure or a microgrid. External power supply PG supplies AC power to EVSE 40.

EVSE 40 is a DC power feed facility (a DC type power feed facility) that provides DC power. EVSE 40 includes a controller 41, charging cable 42, a power conversion circuit 421, a monitoring module 422 that monitors a state of power conversion circuit 421, and a touch panel display 44. Charging cable 42 is connected to a main body of EVSE 40. Charging cable 42 may be attachable to and removable from the main body of EVSE 40. Charging cable 42 includes connector 43 at its tip end and contains a power line and a communication line.

Controller 41 may be a computer. Controller 41 includes a processor and is configured to control power conversion circuit 421 and touch panel display 44. Touch panel display 44 provides information (including an instruction) entered by a user to controller 41 or show information in accordance with an instruction from controller 41.

Power conversion circuit 421 converts AC power supplied from external power supply PG into DC power and provides DC power to connector 43. Power conversion circuit 421 includes, for example, an inverter. Power conversion circuit 421 may further include at least one of a rectification circuit, a power factor correction (PFC) circuit, an insulating circuit, a transformer (for example, an insulating transformer), and a filter circuit. Power conversion circuit 421 is controlled by controller 41.

Monitoring module 422 includes various sensors that detect a state of power conversion circuit 421 and provides a result of detection to controller 41. In this embodiment, monitoring module 422 is configured to detect a voltage and a current provided as input to power conversion circuit 421 and a voltage and a current provided as output from power conversion circuit 421. Monitoring module 422 is configured to detect power fed from EVSE 40.

Vehicle 50 includes inlet 110 for contact charging. As connector 43 of charging cable 42 connected to the main body of EVSE 40 is connected to (plugged into) inlet 110 of vehicle 50, vehicle 50 enters a plugged-in state. In the plugged-in state, vehicle 50 and EVSE 40 can communicate with each other and electric power can be supplied and received between EVSE 40 and vehicle 50. In vehicle 50 in the plugged-in state, external charging (that is, charging of battery 130 with electric power supplied from EVSE 40) can be carried out. Electric power for external charging is supplied from EVSE 40 through charging cable 42 to inlet 110. In external charging, charge relay 120 is closed (connected), and when external charging is not carried out, charge relay 120 is opened (disconnected).

Communication between ECU 150 (vehicle 50) and controller 41 (EVSE 40) may be of any type, and for example, controller area network (CAN) or PLC may be adopted. Though FIG. 1 shows only inlet 110 adapted to a power feed type of EVSE 40, vehicle 50 may include a plurality of inlets so as to adapt to a plurality of types of power feed (for example, an AC type and a DC type).

Figure 2:
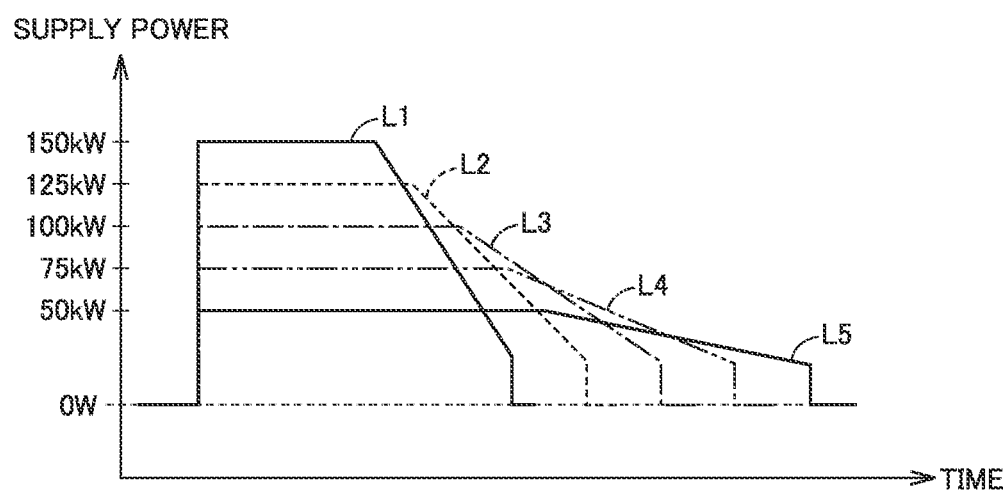
FIG. 2 is a diagram showing transition of supply power when a power feed facility according to the embodiment of the present disclosure feeds power at each of five maximum supply powers.

In this embodiment, EVSE 40 is configured to be variable in maximum supply power in five stages. In other words, EVSE 40 is configured to feed power at five maximum supply powers. FIG. 2 is a diagram showing transition of supply power when EVSE 40 feeds power at each of five maximum supply powers.

Referring to FIG. 2 together with FIG. 1, lines L1, L2, L3, L4, and L5 show transition of supply power when EVSE 40 feeds power at conditions of maximum supply power 150 kW, 125 kW, 100 kW, 75 kW, and 50 kW. Supply power shown in FIG. 2 is electric power supplied by EVSE 40 such as electric power supplied from EVSE 40 to vehicle 50. Maximum supply power refers, for example, to a maximum value of electric power supplied from EVSE 40 to vehicle 50 during charging of battery 130. As shown with lines L1 to L5, supply power from EVSE 40 increases as charging is started, it is maintained at maximum supply power as it reaches maximum supply power, and it gradually lowers from maximum supply power when charging comes to an end. Transition of supply power from EVSE 40 is not limited to the example shown in FIG. 2.

Referring again to FIG. 1, ECU 150 includes a processor 151, a random access memory (RAM) 152, a storage 153, and a timer 154. ECU 150 may be a computer. A central processing unit (CPU) may be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Vehicle 50 further includes a travel driving unit 140, an input apparatus 161, a meter panel 162, a navigation system (which is referred to as a "NAVI" below) 170, and communication equipment 180.

Travel driving unit 140 includes a power control unit (PCU) and a motor generator (MG) which are not shown, and allows vehicle 50 to travel with electric power stored in battery 130. The PCU includes, for example, an inverter, a converter, and a relay (none of which is shown). The relay included in the PCU is referred to as a "system main relay (SMR)" below. The PCU is controlled by ECU 150. The MG is implemented, for example, by a three-phase AC motor generator. The MG is driven by the PCU and rotates a drive wheel of the vehicle. The MG performs regeneration and supplies regenerated electric power to battery 130. The SMR switches between connection and disconnection of an electric power path from battery 130 to the MG. The SMR is closed (connected) when vehicle 50 travels.

Input apparatus 161 accepts an input from a user. Input apparatus 161 is operated by a user and outputs a signal corresponding to the operation by the user to ECU 150. Examples of input apparatus 161 include various switches, various pointing devices, a keyboard, and a touch panel. Input apparatus 161 may include a smart speaker that accepts audio input.

Meter panel 162 shows information on vehicle 50. Meter panel 162 shows, for example, various types of information on vehicle 50 measured by various sensors mounted on vehicle 50. Information shown on meter panel 162 may include at least one of an outdoor temperature, a traveling speed of vehicle 50, an SOC of battery 130, average electric power consumption of vehicle 50, and a travel distance of vehicle 50. Meter panel 162 may be implemented by a touch panel display. Meter panel 162 is controlled by ECU 150. ECU 150 may have meter panel 162 show a message for a user or a warning indicator when a prescribed condition is satisfied.

NAVI 170 includes a processor, a storage, a touch panel display, and a global positioning system (GPS) module (none of which is shown). The storage stores map information. The touch panel display accepts an input from a user or shows a map and other types of information. The GPS module receives a signal (which is referred to as a "GPS signal" below) from a GPS satellite. NAVI 170 can identify a position of vehicle 50 based on a GPS signal. NAVI 170 conducts a path search for finding a travel route (for example, a shortest route) from the current position of vehicle 50 to a destination based on an input from the user, and shows the travel route found by the path search on a map.

Communication equipment 180 includes various communication interfaces (I/F). Communication equipment 180 may include a data communication module (DCM). Communication equipment 180 may include a communication I/F adapted to the Fifth Generation Mobile Communication System (5G). ECU 150 wirelessly communicates with a communication apparatus outside the vehicle through communication equipment 180.

Communication equipment 180 mounted on vehicle 50 wirelessly communicates with each of portable terminal 80 and server 30. Server 30 includes a controller 31 and a communication apparatus 32. Controller 31 may be a computer. Communication apparatus 32 includes various communication I/Fs. Controller 31 includes a processor, performs prescribed information processing, and communicates with the outside through communication apparatus 32.

Server 30 provides a cloud service. Server 30 is configured to collectively manage information on a plurality of pieces of EVSE. A cloud CL provided by server 30 holds information (including fee information) of each piece of EVSE. Server 30 can extract information on EVSE of interest (for example, a fee table which will be described later) from various types of information within cloud CL by search with the use of an identification code and position information of EVSE of interest. Server 30 corresponds to an exemplary "server outside the vehicle" according to the present disclosure.

ECU 150 controls portable terminal 80 through wireless communication and has portable terminal 80 give a notification to a user. Communication equipment 180 and portable terminal 80 may communicate with each other through short-range communication such as Bluetooth® (for example, direct communication in a vehicle or within an area around the vehicle).

Figures 3, 4:
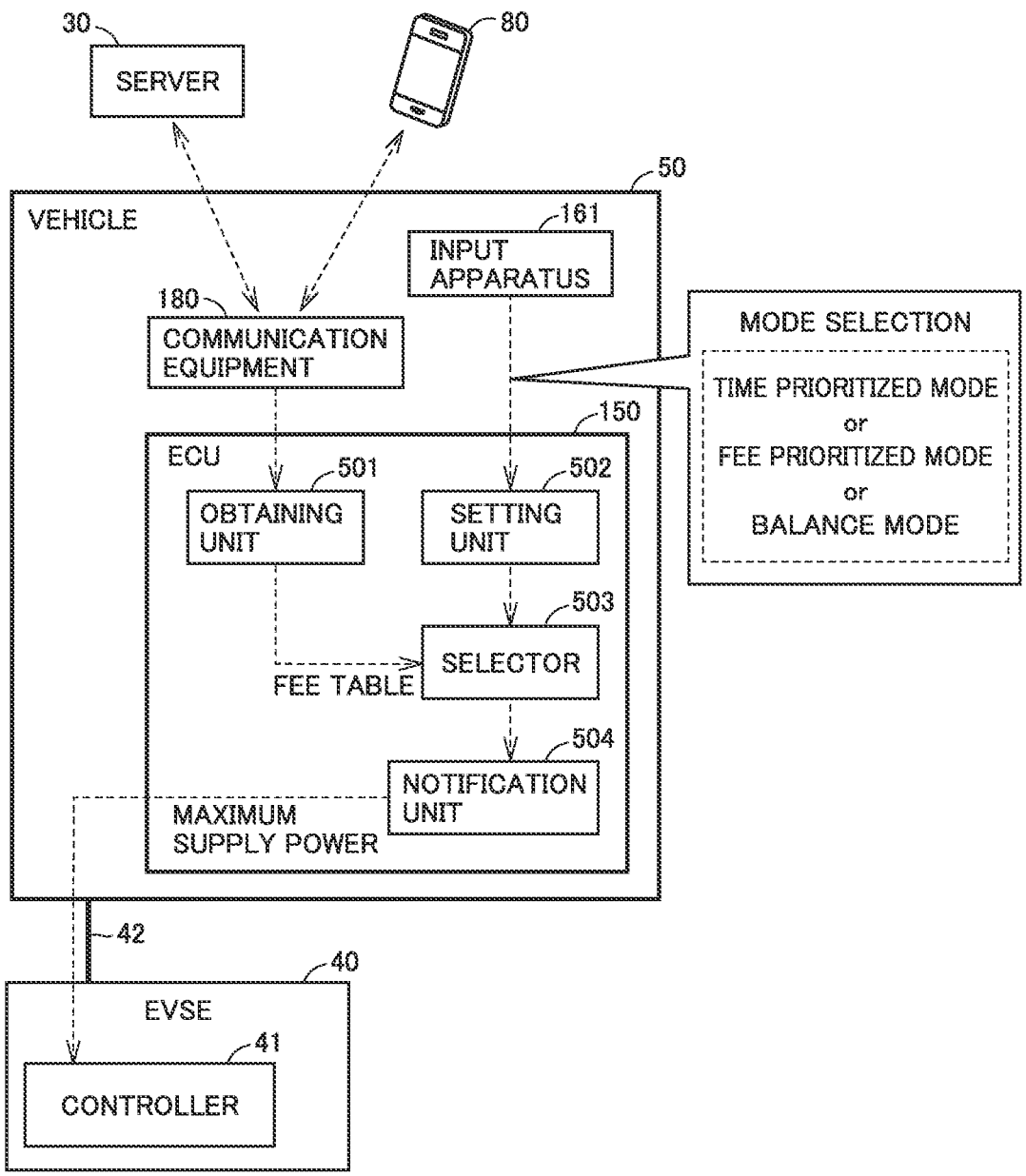
FIG. 3 is a functional block diagram showing for each function, a component of an ECU (a controller mounted on a vehicle) according to the embodiment of the present disclosure.
FIG. 4 is a diagram showing a fee table of the power feed facility according to the embodiment of the present disclosure.

FIG. 3 is a functional block diagram showing a component of ECU 150 for each function. Referring to FIG. 3, ECU 150 includes an obtaining unit 501, a setting unit 502, a selector 503, and a notification unit 504. In this embodiment, each unit is implemented by processor 151 shown in FIG. 1 and a program executed by processor 151. Without being limited as such, each unit may be implemented by dedicated hardware (electronic circuitry). ECU 150 corresponds to an exemplary "controller" according to the present disclosure.

Obtaining unit 501 is configured to obtain a fee table showing charge fee information for each maximum supply power of a power feed facility (for example, EVSE 40) before start of charging of battery 130 with the use of the power feed facility. Though details will be described later, obtaining unit 501 according to this embodiment obtains the fee table from server 30 shown in FIG. 1. FIG. 4 is a diagram showing an exemplary fee table. The fee table shown in FIG. 4 is a fee table of EVSE 40.

Referring to FIG. 4, this fee table shows a fee structure in which a fee charge rate is higher as maximum supply power is higher. The fee charge rate corresponds to a unit price of a charge fee in usage-based pricing. In this example, a usage-based pricing system in which a fee is charged based on a charging time period is adopted as a pricing system. The fee charge rate shown in FIG. 4 is a fee charge rate per unit time. The fee charge rate shown in FIG. 4 corresponds to exemplary "charge fee information" according to the present disclosure.

The fee table shown in FIG. 4 shows the fee charge rate for each of five maximum supply powers (50 kW, 75 kW, 100 kW, 125 kW, and 150 kW) among which EVSE 40 can switch. Specifically, when electric power is fed under a condition of maximum supply power 50 kW or 75 kW, the fee charge rate of 0.25 dollar per one minute is adopted. When electric power is fed under a condition of maximum supply power 100 kW or 125 kW, the fee charge rate of 0.69 dollar per one minute is adopted. When electric power is fed at a condition of maximum supply power 150 kW, the fee charge rate of 0.99 dollar per one minute is adopted. The fee table shown in FIG. 4 thus shows the fee charge rate (charge fee information) for each maximum supply power of EVSE 40.

Referring again to FIG. 3, setting unit 502 is configured to set a criterion for selecting maximum supply power (which is also referred to as a "selection criterion" below). Specifically, setting unit 502 is configured to set one selection criterion among prescribed options in accordance with an input from a user. In this embodiment, setting unit 502 performs processing shown in FIG. 5 which will be described below.

Figure 5:
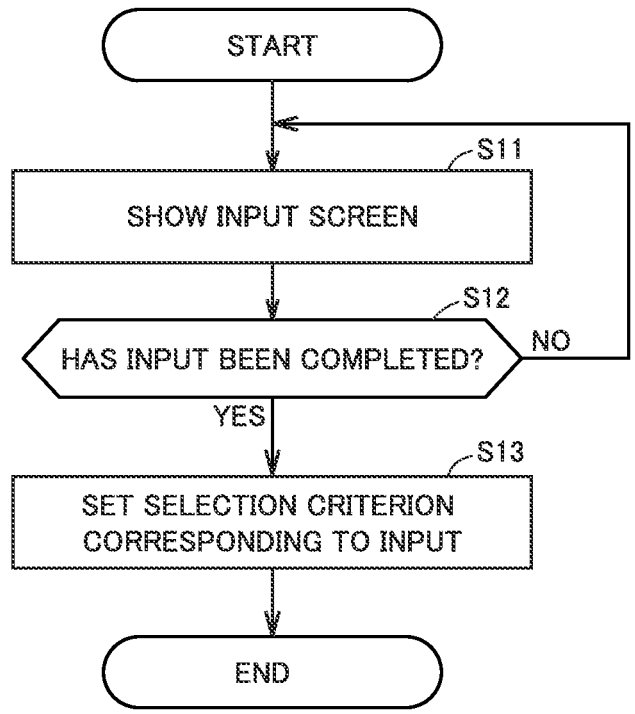
FIG. 5 is a flowchart showing processing involved with setting of a criterion performed by a setting unit according to the embodiment of the present disclosure.

FIG. 5 is a flowchart showing processing involved with setting of the selection criterion. Processing shown in this flowchart is started, for example, in response to a request from a user. The user can request ECU 150 to start processing, for example, by operating input apparatus 161 or portable terminal 80. Each step in the flowchart is simply denoted as "S" below.

Referring to FIG. 5 together with FIG. 3, in S11, setting unit 502 has an input screen shown on a prescribed display. The input screen is a screen where an input from the user is accepted. In S12, setting unit 502 determines whether or not the user has given input onto the input screen. Then, S11 and S12 are repeated until the user gives input onto the input screen. In this embodiment, meter panel 162 (for example, a touch panel display) shown in FIG. 1 is adopted as the prescribed display. Without being limited as such, NAVI 170 or portable terminal 80 may be adopted as the prescribed display.

Figure 6:
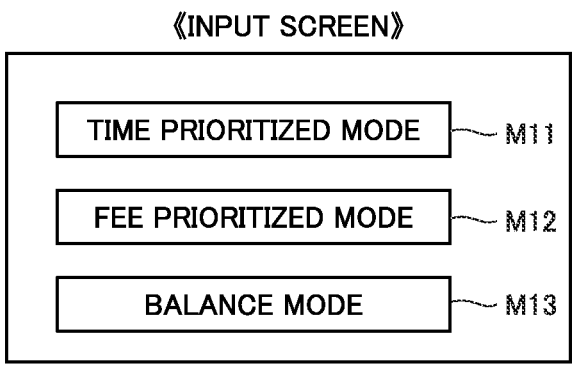
FIG. 6 is a diagram showing an exemplary input screen shown in the processing shown in FIG. 5.

FIG. 6 is a diagram showing an exemplary input screen shown in S11 in FIG. 5. Referring to FIG. 6, this input screen includes a "time prioritized mode" button M11, a "fee prioritized mode" button M12, and a "balance mode" button M13. By operating the button, the user can select a mode (the fee prioritized mode/the time prioritized mode/the balance mode) corresponding to each button. As the user operates any button, determination as YES is made in S12 in FIG. 5 and the process proceeds to S13. Though a virtual button shown on the touch panel display is adopted as the button for the user to select a mode in this embodiment, a physical button may be adopted instead of the virtual button.

Referring again to FIG. 5 together with FIG. 3, in S13, setting unit 502 sets in selector 503, the selection criterion corresponding to the mode selected by the user. For example, when the user operates "time prioritized mode" button M11 in the input screen shown in FIG. 6, a first criterion is set in selector 503. The first criterion prescribes that maximum supply power shortest in charging time period be selected. The charging time period means a time period from start of charging to completion of charging. When the user operates "fee prioritized mode" button M12 in the input screen shown in FIG. 6, a second criterion is set in selector 503. The second criterion prescribes that maximum supply power most inexpensive in charge fee be selected. The charge fee refers to a fee (an amount) to be paid for one charging (charging of interest). When the user operates "balance mode" button M13 in the input screen shown in FIG. 6, a third criterion is set in selector 503. The third criterion prescribes that maximum supply power best in comprehensive evaluation of the charging time period and the charge fee be selected. A method of evaluating the charging time period and the charge fee will be described later.

As set forth above, in this embodiment, setting unit 502 sets one selection criterion among the first to third criteria in accordance with input from the user. In this embodiment, the user gives input relating to setting of the selection criterion through meter panel 162 (touch panel display). Without being limited as such, the user may give input by operating input apparatus 161, NAVI 170, or portable terminal 80 instead of meter panel 162.

Referring again to FIG. 3, selector 503 selects one maximum supply power from the fee table (specifically, the fee table obtained by obtaining unit 501) in accordance with the selection criterion (any one of the first to third criteria described above) set by setting unit 502. Then, notification unit 504 notifies the power feed facility (that is, the power feed facility to be used in present charging) of maximum supply power selected by selector 503.

Figure 7:
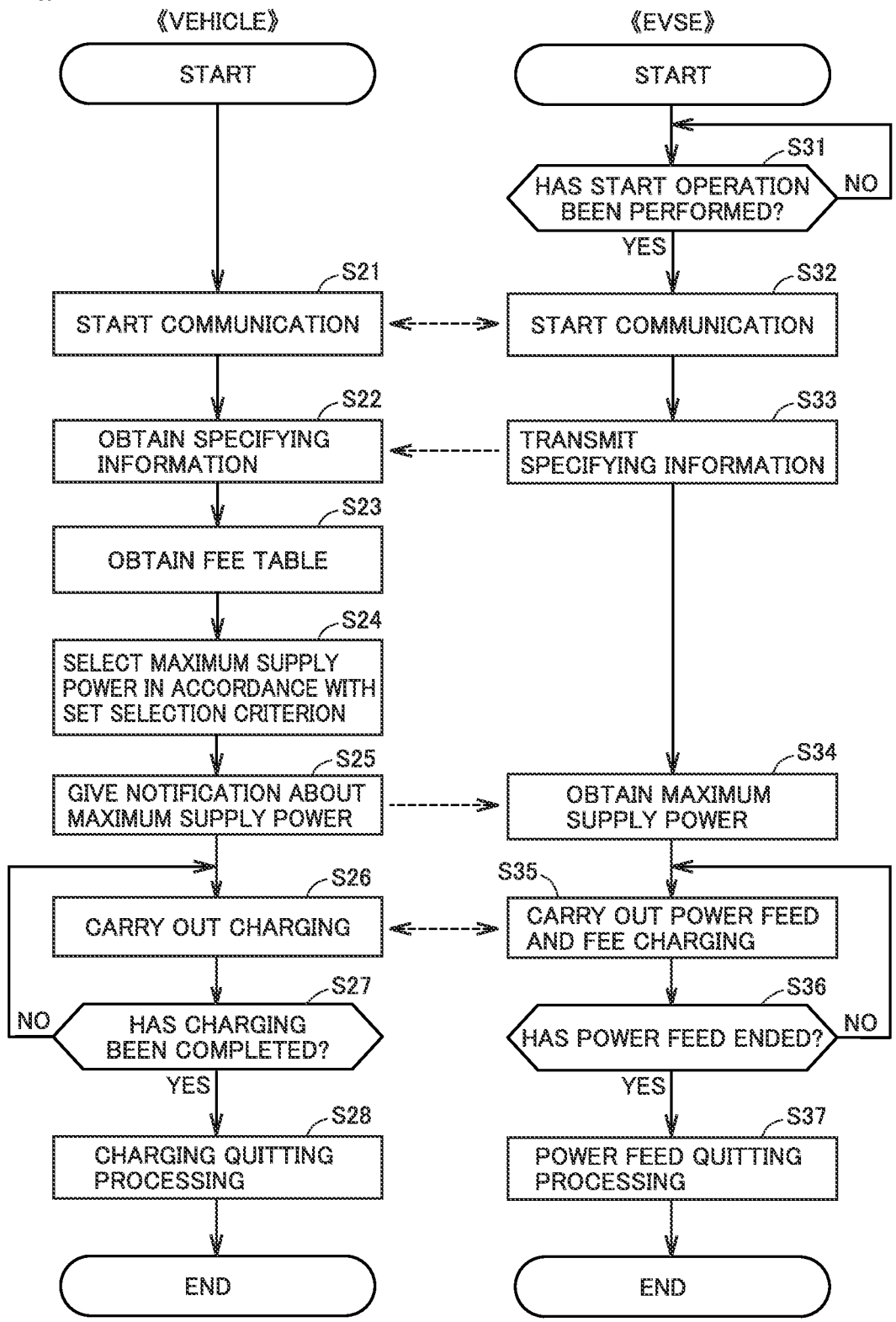
FIG. 7 is a flowchart showing a charging method according to the embodiment of the present disclosure.

FIG. 7 is a flowchart showing processing performed in vehicle 50 and EVSE 40 during charging. The processing shown in this flowchart is started, for example, when vehicle 50 and EVSE 40 are connected to each other through charging cable 42 and vehicle 50 enters the plugged-in state.

Referring to FIG. 7 together with FIGS. 1 and 3, in S31, controller 41 of EVSE 40 determines whether or not a user has performed a prescribed starting operation. In this embodiment, an operation by a user to press a start switch provided in EVSE 40 is defined as a prescribed start operation. The start switch may be a virtual button shown on touch panel display 44 or a physical button.

When the user performs the prescribed starting operation (YES in S31), in S32, controller 41 of EVSE 40 starts communication with vehicle 50. In response, in S21, ECU 150 of vehicle 50 also starts communication with EVSE 40. Communication between controller 41 (EVSE 40) and ECU 150 (vehicle 50) is thus started.

In succession, in S33, controller 41 transmits specifying information of EVSE 40 to ECU 150. Controller 41 may transmit specifying information in response to a request from ECU 150 or may voluntarily transmit specifying information. The specifying information of EVSE 40 is information for specifying EVSE 40. In this embodiment, in S33, controller 41 transmits an identification code of EVSE 40 as the specifying information. The identification code of EVSE 40 may be an identification number of EVSE 40.

In S22, ECU 150 receives the identification code transmitted from EVSE 40. ECU 150 detects a position (for example, a latitude and a longitude) of vehicle 50 by making use of a position detection function of NAVI 170. Since vehicle 50 is connected to EVSE 40, the position of vehicle 50 can be regarded as the position of EVSE 40. The position of EVSE 40 thus obtained also corresponds to the specifying information of EVSE 40. Though ECU 150 obtains position information of EVSE 40 from NAVI 170 in this embodiment, ECU 150 may obtain the position information of EVSE 40 from EVSE 40, together with the identification code of EVSE 40.

In succession, in S23, obtaining unit 501 (FIG. 3) of ECU 150 sends the specifying information to server 30 and requests server 30 to transmit the fee table of the power feed facility specified by the specifying information. In this embodiment, obtaining unit 501 makes a reference to server 30 as to the fee table of EVSE 40 based on the specifying information (that is, the identification code and the position information) of EVSE 40. Server 30 extracts the fee table of EVSE 40 from various types of information within cloud CL based on the specifying information of EVSE 40 in response to the request from obtaining unit 501 (vehicle 50), and transmits the fee table of EVSE 40 to vehicle 50. Obtaining unit 501 receives the fee table of EVSE 40 transmitted from server 30. When vehicle 50 thus carries out charging of battery 130 by using EVSE 40, obtaining unit 501 obtains the fee table (see FIG. 4) of EVSE 40 before start of charging.

Figures 8, 9:
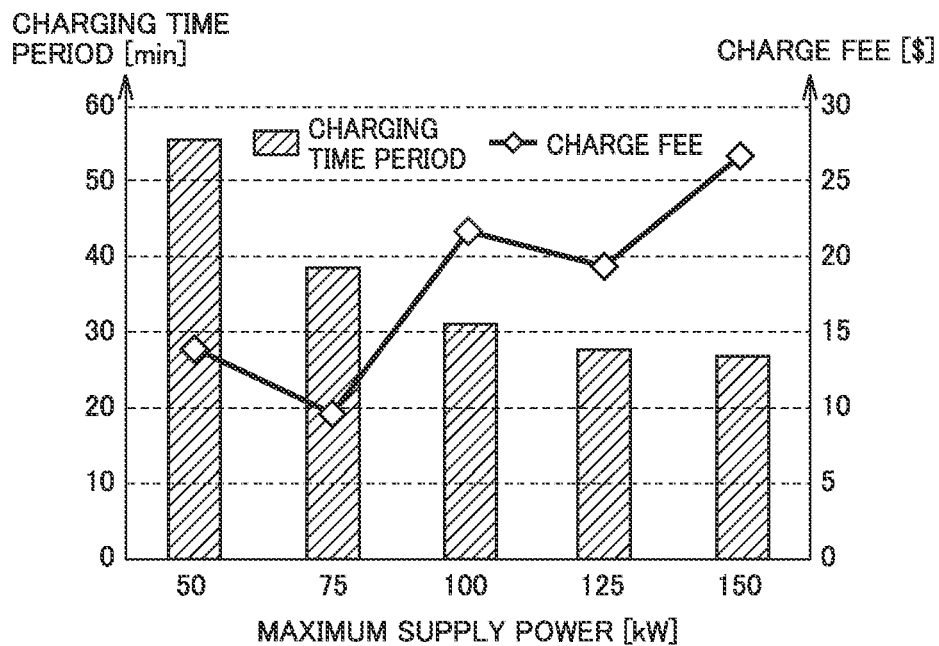
FIG. 8 is a diagram for illustrating a method of prediction of a charging time period and a charge fee by a selector according to the embodiment of the present disclosure.
FIG. 9 is a diagram for illustrating a method of evaluating the charging time period and the charge fee by a third criterion (balance mode) in the embodiment of the present disclosure.

In succession, in S24, selector 503 (FIG. 3) of ECU 150 selects one maximum supply power from among maximum supply powers (50 kW, 75 kW, 100 kW, 125 kW, and 150 kW) shown in the fee table of EVSE 40, in accordance with the selection criterion (see FIG. 5) set by setting unit 502. In this embodiment, selector 503 predicts the charging time period by using the fee table, and calculates the charge fee based on the predicted charging time period and the fee charge rate per unit time corresponding to the maximum supply power. FIG. 8 is a diagram showing an exemplary charging time period and an exemplary charge fee predicted by selector 503. In FIG. 8, the line graph shows the charge fee and the bar graph shows the charging time period.

Referring to FIG. 8 together with FIG. 4, selector 503 predicts that the charging time period is shorter as maximum supply power is higher. In the example shown in FIG. 8, charging time periods when maximum supply power is set to 50 kW, 75 kW, 100 kW, 125 kW, and 150 kW are predicted as fifty five minutes, thirty eight minutes, thirty one minutes, twenty eight minutes, and twenty six minutes, respectively. Then, selector 503 calculates the charge fee by multiplying the predicted charging time period by the fee charge rate (see FIG. 4) shown in the fee table. For example, according to the fee table shown in FIG. 4, when maximum supply power is 100 kW, the fee charge rate of 0.69 dollar per one minute is adopted. Therefore, the charge fee at the time when maximum supply power is 100 kW is calculated as twenty one dollars in accordance with an expression "charge fee=thirty one minutes×0.69 dollar/minute." Similarly, the charge fees at the time when maximum supply power is set to 50 kW, 75 kW, 125 kW, and 150 kW are calculated as fourteen dollars, ten dollars, nineteen dollars, and twenty six dollars, respectively.

When setting unit 502 sets the first criterion (time prioritized mode) as the selection criterion, in S24 in FIG. 7, selector 503 selects 150 kW shortest in charging time period as maximum supply power. When setting unit 502 sets the second criterion (fee prioritized mode) as the selection criterion, in S24 in FIG. 7, selector 503 selects 75 kW most inexpensive in charge fee as maximum supply power. When setting unit 502 sets the third criterion (balance mode) as the selection criterion, selector 503 comprehensively evaluates the charging time period and the charge fee for each maximum supply power, for example, with a method which will be described below.

FIG. 9 is a diagram for illustrating a method of evaluating the charging time period and the charge fee by the third criterion (balance mode). Referring to FIG. 9, selector 503 converts the charging time period into an evaluation value with one minute being defined as one point, and converts the charge fee into an evaluation value with one dollar being defined as one point. Then, the selector obtains a comprehensive evaluation value of each maximum supply power by summing the evaluation value of the charging time period and the evaluation value of the charge fee. As shown in FIG. 9, the comprehensive evaluation values (points) of maximum supply powers 50 kW, 75 kW, 100 kW, 125 kW, and 150 kW are calculated as 69, 48, 52, 47, and 52, respectively. In this evaluation method, a smaller point (pt) means better evaluation. Therefore, when setting unit 502 sets the third criterion (balance mode) as the selection criterion, in S24 in FIG. 7, selector 503 selects 125 kW best in comprehensive evaluation of the charging time period and the charge fee as maximum supply power.

Referring again to FIG. 7 together with FIGS. 1 and 3, in S25, notification unit 504 (FIG. 3) of ECU 150 notifies controller 41 (EVSE 40) of maximum supply power selected by selector 503 in S24. Then, in S34, controller 41 receives maximum supply power transmitted from ECU 150.

In succession, in S35, controller 41 of EVSE 40 supplies electric power for charging of battery 130 to vehicle 50 under a power feed condition in accordance with maximum supply power received in S34 while it charges a fee in accordance with the fee table (FIG. 4) of EVSE 40 based on the fee charge rate corresponding to maximum supply power received in S34. Controller 41 controls power conversion circuit 421 to increase supply power until maximum supply power received in S34 is attained (see FIG. 2). Then, in S36, controller 41 determines whether or not to quit power feed. Controller 41 continues power feed and fee charging (S35) until determination as YES (end of power feed) is made in S36. Controller 41 makes determination as YES in S36 when it is notified of completion of charging from ECU 150 (vehicle 50).

In S26, ECU 150 of vehicle 50 has charge relay 120 closed to carry out external charging of battery 130 with electric power (DC power in this embodiment) supplied from EVSE 40. Then, in S27, ECU 150 determines whether or not charging has been completed. ECU 150 continues external charging (S26) until determination as YES (completion of charging) is made in S27. When the state of charge (SOC) of battery 130 is equal to or larger than a prescribed SOC value (for example, an SOC value indicating full charge), ECU 150 makes determination as YES in S27. In this embodiment, external charging is continued until battery 130 is fully charged. During charging, controller 41 (EVSE 40) controls supply power in accordance with the SOC of battery 130 while it communicates with ECU 150 (vehicle 50) (see FIG. 2).

When ECU 150 determines that charging of battery 130 has been completed (YES in S27), in S28, ECU 150 notifies controller 41 of completion of charging and opens charge relay 120. Charging of battery 130 thus ends.

When controller 41 of EVSE 40 receives a notification of completion of charging from ECU 150, in S36, it makes determination as YES, and has the process proceed to S37. In S37, controller 41 controls power conversion circuit 421 to stop supply of electric power to vehicle 50. Power feed by EVSE 40 thus ends. After the end of power feed, controller 41 asks a user of vehicle 50 to pay the fee for present charging (power feed) (that is, the charge fee charged in S35). Controller 41 may give a notification about payment of the charge fee to at least one of ECU 150 and portable terminal 80.

As described above, in the charging method according to this embodiment, the power storage (battery 130) mounted on vehicle 50 is charged with the use of EVSE 40 (see FIG. 4) varied in charge fee in accordance with maximum supply power. Then, the charging method according to this embodiment includes the processing shown in FIG. 5 and the processing shown in FIG. 7. In the processing shown in FIG. 5, vehicle 50 sets the criterion (selection criterion) for selecting maximum supply power. In S23 in FIG. 7, vehicle 50 obtains the fee table (FIG. 4) showing the fee charge rate (charge fee information) for each maximum supply power of EVSE 40 before start of charging of battery 130 with the use of EVSE 40. In S24 in FIG. 7, vehicle 50 selects one maximum supply power from the fee table in accordance with the set selection criterion. In S25 in FIG. 7, vehicle 50 notifies EVSE 40 of selected maximum supply power. In S35 in FIG. 7, EVSE 40 supplies electric power for charging battery 130 to vehicle 50 under a power feed condition in accordance with maximum supply power of which the EVSE was notified, while EVSE 40 charges the fee in accordance with the fee table based on the fee charge rate (charge fee information) corresponding to maximum supply power of which the EVSE was notified.

According to the charging method, appropriate maximum supply power can be selected in charging in which the fee is charged based on the fee structure varied in charge fee in accordance with maximum supply power of the power feed facility. Then, vehicle 50 can charge battery 130 by receiving power feed at appropriate maximum supply power.

Figure 10:
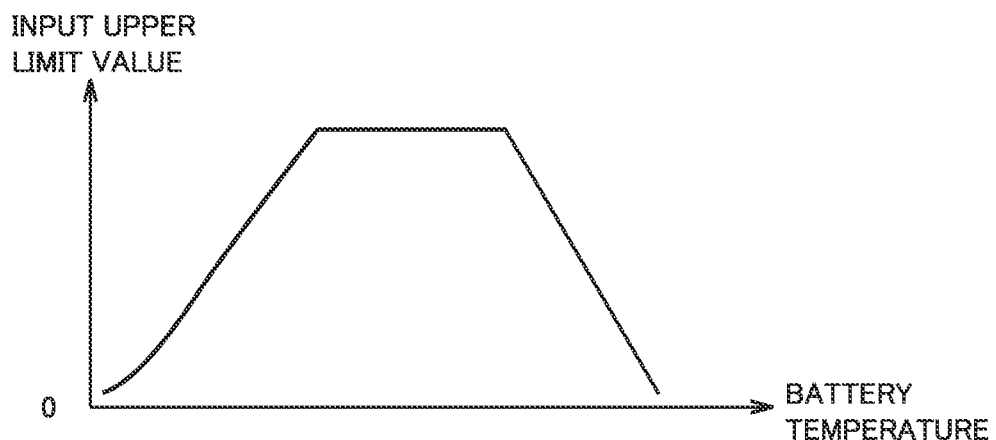
FIG. 10 is a diagram showing an exemplary map for setting an input upper limit value of a power storage.

Selector 503 may be configured to exclude, when input electric power to battery 130 is restricted to an input upper limit value or less, maximum supply power at which input electric power to battery 130 exceeds the input upper limit value among maximum supply powers shown in the fee table and to select one maximum supply power from among remaining maximum supply powers. For example, ECU 150 may set the input upper limit value of battery 130 based on a prescribed map and restrict input electric power to battery 130 to the set input upper limit value or less. FIG. 10 is a diagram showing an exemplary map for setting the input upper limit value of battery 130. Referring to FIG. 10, in this map, the input upper limit value of battery 130 varies depending on a temperature of battery 130. The input upper limit value represents electric power that can be provided to battery 130 (that is, a maximum value of input electric power). During travel of vehicle 50, ECU 150 controls, for example, travel driving unit 140 such that electric power exceeding the input upper limit value is not provided to battery 130. The input upper limit value of battery 130 is set, for example, to protect battery 130 or a peripheral component thereof.

Figure 11:
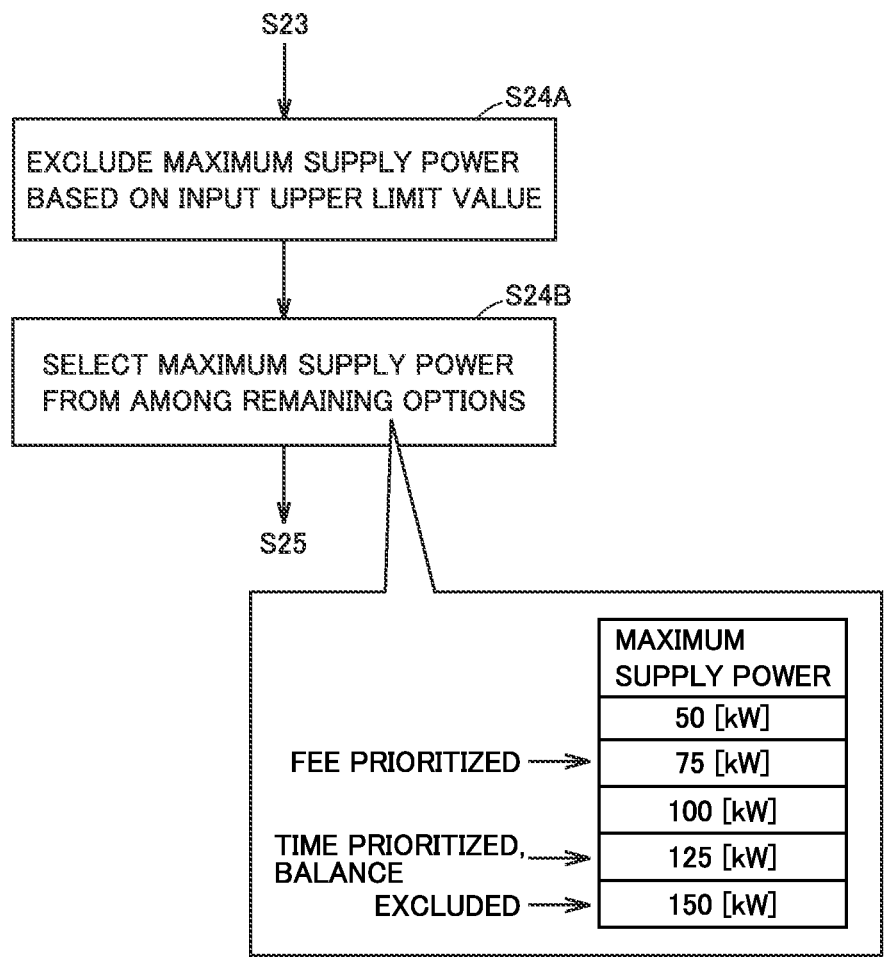
FIG. 11 is a diagram showing a modification of the processing shown in FIG. 7.

FIG. 11 is a diagram showing a modification of the processing shown in FIG. 7. S24A and S24B shown in FIG. 11 may be adopted instead of S24 in FIG. 7. Referring to FIG. 11 together with FIGS. 1 and 3, in S24A, selector 503 of ECU 150 excludes maximum supply power at which input electric power to battery 130 exceeds the input upper limit value among maximum supply powers shown in the fee table of EVSE 40. For example, when input electric power to battery 130 is expected to exceed the input upper limit value in supply of electric power at 150 kW from EVSE 40 to vehicle 50, selector 503 excludes 150 kW from options for maximum supply power.

Then, after processing in S24A, in S24B, selector 503 selects one maximum supply power from among remaining options for maximum supply power. For example, when 150 kW is excluded in S24A, in S24B, selector 503 selects one maximum supply power from among 50 kW, 75 kW, 100 kW, and 125 kW. In this case, 75 kW is selected by the second criterion (fee prioritized mode), and 125 kW is selected by each of the first criterion (time prioritized mode) and the third criterion (balance mode).

Selector 503 according to the modification can select maximum supply power in conformity with the input upper limit value of battery 130 and EVSE 40 can be notified of maximum supply power.

In the embodiment, the first to third criteria are adopted. Options for the selection criterion, however, can be modified as appropriate. For example, any two selection criteria alone among the first to third criteria may be adopted.

The method of evaluating the charging time period and the charge fee by the third criterion can be modified as appropriate, without being limited to the method shown in FIG. 9. For example, selector 503 may convert the charging time period into an evaluation value by multiplying the charging time period by a coefficient k1 and convert the charge fee into an evaluation value by multiplying the charge fee by a coefficient k2. Then, the selector may obtain a comprehensive evaluation value of each maximum supply power by summing the evaluation value of the charging time period and the evaluation value of the charge fee. Selector 503 may set coefficients k1 and k2 in accordance with an input from the user. For example, when the user desires the balance mode with relatively higher priority being placed on time, selector 503 may set coefficient k1 to 1.0 and set coefficient k2 to less than 1.0 (for example, 0.5). By doing so, maximum supply power shorter in charging time period more tends to be selected than in the balance mode (k1=1.0 and k2=1.0) described previously. Alternatively, when the user desires the balance mode with relatively higher priority being placed on the fee, selector 503 may set coefficient k1 to less than 1.0 (for example, 0.5) and set coefficient k2 to 1.0. By doing so, maximum supply power more inexpensive in charge fee more tends to be selected than in the balance mode (k1=1.0 and k2=1.0) described previously.

Timing to perform the processing shown in FIG. 5 can be modified as appropriate. For example, the processing shown in FIG. 5 may be started when vehicle 50 enters the plugged-in state. The processing shown in FIG. 5 may be performed before S21 in FIG. 7.

In the embodiment, setting unit 502 is configured to set the selection criterion in accordance with an input from the user. Without being limited as such, setting unit 502 may be configured to set the selection criterion based on the position of the power feed facility. Setting unit 502 may perform processing shown in FIG. 12 which will be described below, instead of the processing shown in FIG. 5.

FIG. 12 is a flowchart showing a modification of the processing shown in FIG. 5. The processing shown in this flowchart is started, for example, when vehicle 50 and EVSE 40 are connected to each other through charging cable 42 and vehicle 50 enters the plugged-in state. The processing shown in FIG. 12 may be performed before S21 in FIG. 7.

Referring to FIG. 12 together with FIGS. 1 and 3, in S51, setting unit 502 obtains the position of EVSE 40. A method of obtaining the position may be the same as in S22 in FIG. 7 described previously. In S52 that follows, setting unit 502 determines whether or not EVSE 40 is close to the user's house. For example, setting unit 502 determines that EVSE 40 is close to the user's house (YES in S52) when the position of EVSE 40 is within a prescribed distance from the user's house, and determines that EVSE 40 is not close to the user's house (NO in S52) when the position of EVSE 40 is not within the prescribed distance from the user's house. Setting unit 502 may make determination in S52 in coordination with NAVI 170.

When EVSE 40 is close to the user's house (YES in S52), in 553, setting unit 502 sets the second criterion in selector 503. Thus, in S24 in FIG. 7, maximum supply power more inexpensive in charge fee more tends to be selected. When EVSE 40 is not close to the user's house (NO in S52), in 554, setting unit 502 sets the first criterion in selector 503. Thus, in S24 in FIG. 7, maximum supply power shorter in charging time period more tends to be selected.

With setting unit 502 according to the modification, vehicle 50 can select maximum supply power in conformity with the position of the power feed facility and notify the power feed facility of maximum supply power.

Setting unit 502 may be configured to predict the number of facility users of the power feed facility based on the position of the power feed facility, to set the first criterion (time prioritized mode) when a large number of facility users are predicted to use the power feed facility, and to set the second criterion (fee prioritized mode) when a small number of facility users are predicted to use the power feed facility. For example, when the power feed facility is located on the premises of a commercial facility, setting unit 502 may predict that a large number of facility users will use the power feed facility. When the position of the power feed facility is within a prescribed area, setting unit 502 may predict that a small number of facility users will use the power feed facility, and when the position of the power feed facility is outside the prescribed area, setting unit 502 may predict that a large number of facility users will use the power feed facility. The user may set as the prescribed area, a region where there are a small number of facility users of the power feed facility. Alternatively, a region where there are a small number of facility users of the power feed facility may be set as the prescribed area by machine learning using artificial intelligence (AI) and big data.

In the embodiment, EVSE 40 is configured to be variable in maximum supply power in five stages. Without being limited as such, a manner of variation in maximum supply power can be modified as appropriate. For example, EVSE 40 may be configured to more finely be variable in maximum supply power. EVSE 40 may be configured to be variable in maximum supply power, for example, in steps of 10 W.

The configuration of the power feed facility is not limited to the configuration shown in FIG. 1. For example, a circuit breaker that switches between supply and cut-off of electric power may be provided between external power supply PG and power conversion circuit 421. The power feed facility is not limited to a DC power feed facility but may be an AC power feed facility that establishes high layer compatibility (HLC) communication.

The configuration of the vehicle is not limited to the configuration shown in FIG. 1. The vehicle may be configured to be wirelessly chargeable. For example, the vehicle is not limited to a BEV and may be a PHEV. The vehicle is not limited to a passenger car, and a bus or a truck may be applicable. The vehicle may be an autonomous vehicle or may perform a flying function. The vehicle may be a vehicle that can travel without human intervention (for example, an automated guided vehicle or an agricultural implement).

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A charging system comprising:
   a vehicle;
   a power feed facility outside the vehicle; and
   a server outside the vehicle, wherein
   the vehicle includes:
      a power storage; and
      a first controller configured to control charging of the power storage,
   the power feed facility includes:
      a power conversion circuit configured to convert AC power into DC power; and
      a second controller configured to control the power conversion circuit,
   the server is configured to collectively manage fee tables for a plurality of power feed facilities including the power feed facility, the fee tables including a fee table for the power feed facility showing charge fee information for each of a plurality of maximum supply powers of the power feed facility,
   the first controller is configured to:
      obtain specifying information for specifying the power feed facility before start of charging of the power storage by using the power feed facility,
      request the server to transmit the fee table for the power feed facility specified by the specifying information,
      in response to receiving the fee table for the power feed facility from the server,
      select one maximum supply power in the fee table for the power feed facility in accordance with a criterion set for selection of maximum supply power of the power feed facility, and
      notify the power feed facility of the selected maximum supply power,
      determine whether charging of the power storage has been completed, and
      when the first controller determines that charging of the power storage has been completed, notify the second controller of completion of charging,
   the second controller is configured to:
      control, in response to receiving the maximum supply power from the vehicle, the power conversion circuit to supply DC power for charging the power storage to the vehicle under a power feed condition in accordance with the maximum supply power received from the vehicle, while a fee is being charged in accordance with the charge fee information corresponding to the maximum supply power received from the vehicle based on the fee table for the power feed facility,
      in response to receiving the notification of completion of charging from the vehicle, control the power conversion circuit to stop supply of DC power to the vehicle, wherein
   the first controller is configured to set a criterion from among prescribed options in accordance with an input from a user,
   the fee table shows a fee structure in which a fee charge rate is higher as the maximum supply power of the power feed facility is higher;
   the fee charge rate shown in the fee table is the fee charge rate per unit time, wherein the first controller is configured to, in connection with each of the plurality of maximum supply powers shown in the fee table for the power feed facility:
predict charging time period of the power storage based on the maximum supply power, and
calculate a charge fee based on the predicted charging time period and the fee charge rate per unit time, wherein
the prescribed options include a first criterion, a second criterion, and a third criterion,
the first controller is configured to, in a state where the first criterion is set, select the maximum supply power shortest in the predicted charging time period in the fee table for the power feed facility,
the first controller is configured to, in a state where the second criterion is set, select the maximum supply power most inexpensive in the calculated charge fee in the fee table for the power feed facility, and wherein
the first controller is configured to, in a state where the third criterion is set,
convert the predicted charging time period into a first evaluation value by multiplying the predicted charging time period by a first coefficient,
convert the calculated charge fee into a second evaluation value by multiplying the calculated charge fee by a second coefficient,
obtain a comprehensive evaluation value by summing the first evaluation value and the second evaluation value, and
select one maximum supply power in the fee table for the power feed facility based on the comprehensive evaluation value.

2. The charging system according to claim 1, wherein the first controller is configured
to exclude, when input electric power to the power storage is restricted to an input upper limit value or less, the maximum supply power at which the input electric power to the power storage exceeds the input upper limit value, of the maximum supply powers shown in the fee table, and
to select one maximum supply power from at least one maximum supply power not excluded, of the maximum supply powers.

3. The charging system according to claim 1, wherein the specifying information includes an identification code for identifying the power feed facility and a position of the power feed facility.

4. The charging system according to claim 1, wherein the vehicle further includes a display,
the first controller is configured to control the display to display an input screen in response to a request from a user of the vehicle, the input screen being a screen where an input relating to setting of the criterion from the user is accepted,
the input screen includes:
a first button for the user to select the first criterion;
a second button for the user to select the second criterion; and
a third button for the user to select the third criterion.

5. The charging system according to claim 1, wherein the second controller is configured to ask a user of the vehicle to pay a charge fee charged after the second controller receives the notification of completion of charging from the vehicle.

* * * * *